United States Patent
Wilson et al.

(10) Patent No.: US 10,654,562 B2
(45) Date of Patent: May 19, 2020

(54) LANDING GEAR

(71) Applicant: AIRBUS OPERATIONS LIMITED, Bristol (GB)

(72) Inventors: Frazer Wilson, Bristol (GB); Stephen Briancourt, Bristol (GB); Kamran Iqbal, Bristol (GB); Shabeer Koduvali, Bristol (GB); Raghu Veera Kumar Arja, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 308 days.

(21) Appl. No.: 15/661,115

(22) Filed: Jul. 27, 2017

(65) Prior Publication Data

US 2018/0037314 A1 Feb. 8, 2018

(30) Foreign Application Priority Data

Aug. 3, 2016 (GB) .................... 1613416.5

(51) Int. Cl.
*B64C 25/10* (2006.01)
*B64C 25/12* (2006.01)
*B64C 25/04* (2006.01)

(52) U.S. Cl.
CPC .............. *B64C 25/10* (2013.01); *B64C 25/04* (2013.01); *B64C 25/12* (2013.01)

(58) Field of Classification Search
CPC ................................ B64C 25/10; B64C 25/12
See application file for complete search history.

(56) References Cited

U.S. PATENT DOCUMENTS

| | | |
|---|---|---|
| 2,405,651 A | 8/1946 | Height |
| 4,328,939 A | 5/1982 | Davies et al. |
| 4,345,727 A | 8/1982 | Brown et al. |
| 4,392,623 A | 7/1983 | Munsen et al. |
| 2006/0060700 A1* | 3/2006 | Anderton ............... B64C 25/00 244/100 R |

(Continued)

FOREIGN PATENT DOCUMENTS

| | | |
|---|---|---|
| EP | 0031602 A1 | 7/1981 |
| EP | 1041000 A2 | 10/2000 |

(Continued)

OTHER PUBLICATIONS

EP SR for EP 17 18 4593 dated Sep. 26, 2017; 9 pp.

*Primary Examiner* — Nicholas McFall
*Assistant Examiner* — Terri L Filosi
(74) *Attorney, Agent, or Firm* — Nixon & Vanderhye P.C.

(57) ABSTRACT

An aircraft include a landing gear is disclosed. The landing gear comprises a main strut and an inboard stay assembly connected to the aircraft fuselage such that landing gear loads can be transferred from the inboard stay assembly into the fuselage. The landing gear also comprises a sidestay connected to the wing such that landing gear loads can be transferred from the sidestay into the wing and a link assembly connected to the aircraft such that landing gear loads can be transferred via the link assembly into the aircraft. The landing gear is arranged such that, in use, when the landing gear is extended, substantially all the landing gear loads are transferred from the landing gear to the aircraft via one or more of the inboard stay assembly, the sidestay and the link assembly.

22 Claims, 6 Drawing Sheets

(56) References Cited

U.S. PATENT DOCUMENTS

2006/0237584 A1    10/2006   Hinton
2009/0057484 A1     3/2009   White

FOREIGN PATENT DOCUMENTS

EP        1784330 A2   5/2007
FR        2800705 A1   5/2001
WO      8202179 A1   7/1982

\* cited by examiner

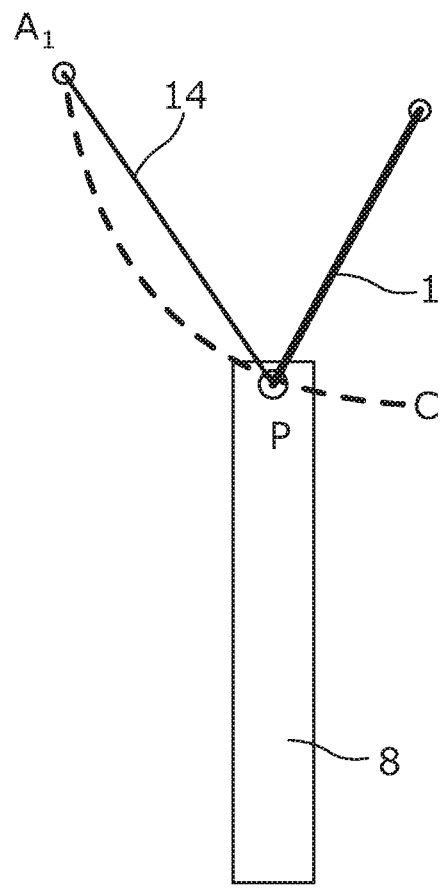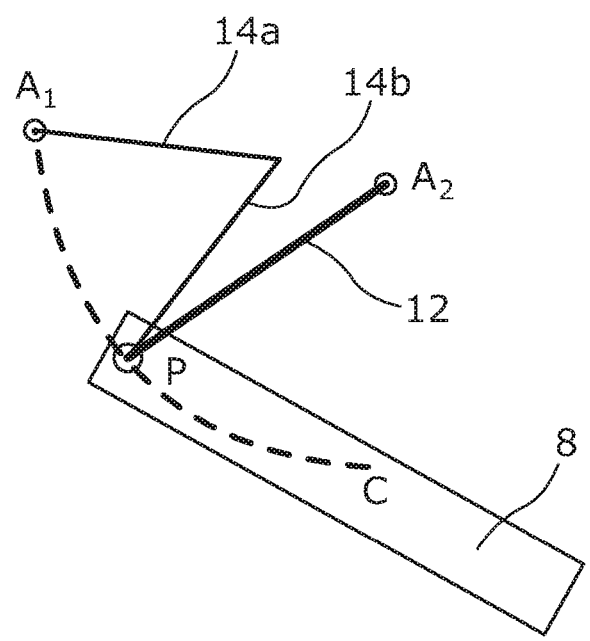
Figure 5(a)
Figure 5(b)
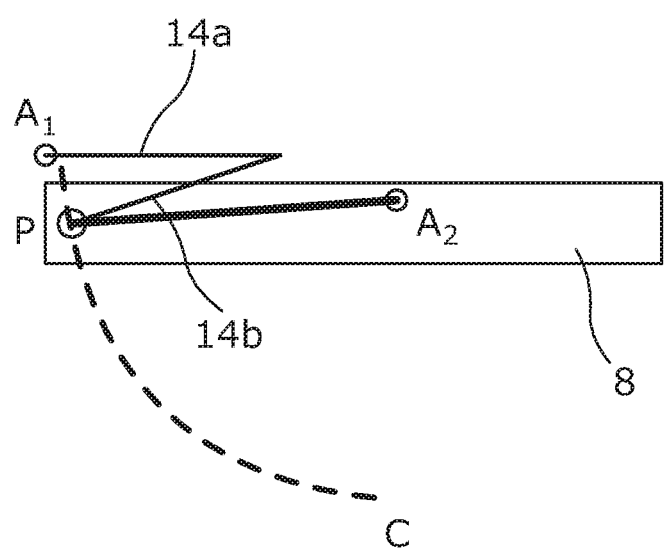
Figure 5(c)

LANDING GEAR

RELATED APPLICATIONS

The present application claims priority from Great Britain Application Number 1613416.5 filed Aug. 3, 2016, the disclosure of which is hereby incorporated by reference herein in its entirety.

BACKGROUND OF THE INVENTION

The present invention concerns an improved landing gear for an aircraft. More particularly, but not exclusively, this invention is concerned with landing gear suitable for use with composite wings. The invention also concerns a method of retracting a landing gear.

The primary loads experienced by a landing gear during normal operations are typically categorised as vertical loads, drag loads and lateral loads. Typically, vertical loads act along an axis parallel to the vertical axis of the aircraft and are generated by the action of gravity on the mass of the aircraft, particularly during landing. Drag loads act along an axis substantially parallel to the longitudinal axis of the aircraft and are generated by friction between the tyres and ground on 'spin up' of the wheels at touchdown and also when braking. Lateral loads act along an axis substantially parallel to the lateral axis of the aircraft and are generated during steering. The landing gear may also be subject to secondary loads such as torque loads and aerodynamic drag.

In certain aircraft the main landing gear is mounted on the wing. The wing structure must have sufficient strength to react the landing gear loads at the point or points to which the landing gear attaches. This may limit the choice of materials that can be used in construction and/or lead to the need for the structure to be reinforced, thereby increasing the weight of the aircraft. This is a particular issue for wings using composite materials, for example Carbon Fibre Reinforced Polymer (CFRP) wings, as these materials are typically anisotropic. For example, CFRP materials can withstand higher loading along the fibre length, but may require substantial reinforcement to accommodate off-axis loads. It would therefore be desirable to provide a landing gear that results in an improved load profile, for example a reduction in the maximum load experienced at the point(s) of attachment to the wing and/or a reduction in off-axis loads.

One prior art method of reducing the loads experienced at any one point of attachment is to provide a landing gear which transfers loads from the landing gear to the aircraft over multiple attachment points including points on both the wing and the fuselage. EP 0 031 602 describes such a landing gear. However, many of those designs provide a very uneven load distribution across the multiple attachment points, with the majority of the load still being carried via one or two attachment points and/or with significant loads still being transferred from the landing gear to the wing. Accordingly, it would be advantageous to provide a landing gear with an improved load distribution.

Typically, modern landing gear are retracted once the aircraft is in flight. Space is at a premium within the envelope of the aircraft and accordingly it is desirable that a landing gear can be retracted into a compact configuration. However, many multiple attachment point landing gears are not particularly compact when retracted and/or are mechanically complex thereby increasing manufacture and/or maintenance costs. It would be advantageous to provide a mechanically simple landing gear that can transfer a significant proportion of the landing gear loads to the fuselage of the aircraft while maintaining a compact configuration when retracted.

The present invention seeks to mitigate one or more of the above-mentioned problems. Alternatively or additionally, the present invention seeks to provide an improved landing gear.

SUMMARY OF THE INVENTION

The present invention provides, according to a first aspect, an aircraft comprising a fuselage, a wing connected to the fuselage and a landing gear. The landing gear may comprise one or more of; a main strut, an inboard stay assembly, a sidestay and/or a link assembly. A first end of the inboard stay assembly may be attached to the main strut and a second end of the inboard stay assembly may be connected to the fuselage such that landing gear loads can be transferred from the inboard stay assembly into the fuselage. A first end of the sidestay may be connected to the main strut and a second end of the sidestay may be connected to the wing such that landing gear loads can be transferred from the sidestay into the wing. A first end of the link assembly may be attached to the main strut and a second end of the link assembly may be connected to the aircraft such that landing gear loads can be transferred via the link assembly into the aircraft. The landing gear may be arranged such that, in use, when the landing gear is extended, substantially all the landing gear loads are transferred from the landing gear to the aircraft via one or more of the inboard stay assembly, the sidestay and the link assembly. Thus, landing gear in accordance with the present invention may be connected, for the purposes of load transfer, to the aircraft via three elements; the inboard stay assembly, the link assembly and the sidestay. Providing a landing gear which is connected in the aircraft in this manner may facilitate a reduction in the amount of load transferred into the wing as the majority of the drag loads can be transferred to the aircraft via the inboard stays.

Landing gear loads may be defined as drag loads, lateral loads and vertical loads experienced by the landing gear when the gear is extended. The landing gear may be arranged such that substantially all the torque loads and aerodynamic drag loads experienced by the landing gear are transferred to the aircraft via one or more of the inboard stay assembly, the link assembly and the sidestay.

Each of the inboard stay assembly, sidestay and link assembly may be connected to the aircraft to cause landing gear loads to be transferred from the landing gear to the aircraft. Each of the inboard stay assembly, sidestay and link assembly may provide a landing gear load path between the main strut and the relevant point(s) of attachment to the aircraft. Thus, the landing gear may be configured to have three principle landing gear load paths via which landing gear loads are transferred to the aircraft; the inboard stay assembly load path, the sidestay load path and the link assembly load path. The landing gear may be configured such that, in use when the landing gear is extended, different components of the landing gear loads are transferred to the aircraft by different ones of the three loads paths.

The landing gear may be configured such that drag loads experienced by the landing gear are transferred to the aircraft via the sidestay and the inboard stay assembly. The landing gear may be configured such that drag loads cannot be transferred to the aircraft via the link assembly.

The connection between the second end of the link assembly and the aircraft may allow for rotational movement such that transmission of drag loads to the aircraft via the link assembly is reduced and/or prevented. The link assembly may be connected at the second end to allow for rotational movement around an axis substantially parallel to the lateral axis of the aircraft. Effectively isolating the point at which the link assembly is attached to aircraft from the drag loads may reduce the amount of load that is transferred to the wing, and instead increase the component of the drag load which is transferred to the fuselage. The link assembly may be connected to the aircraft via a bearing, for example a spherical bearing, that allows rotational movement around an axis substantially parallel to the lateral axis of the aircraft.

The landing gear may be configured such that vertical loads experienced by the landing gear are transferred to the aircraft via the link assembly and the inboard stay assembly. The landing gear may be configured such that vertical loads cannot be transferred to the aircraft via the sidestay.

The first end of the sidestay may be connected to the main strut for movement relative to the main strut. The first end of the sidestay may be connected to the main strut such that the first end can move along a portion of the length of the strut. That is to say, the first end may be connected for axial movement along the length of the strut. Providing a sidestay having freedom to move vertically relative to the main strut may effectively isolate the sidestay from vertical loads experienced by the landing gear. Thus, providing a sidestay having freedom to move vertically relative to the main strut may result in a larger component of the landing gear loads being transferred directly into the fuselage via the inboard links, rather than into the wing via the sidestay.

The first end of the sidestay may be connected to the main strut for rotation about the length, for example about the longitudinal axis, of the main strut. The first end of the sidestay may be connected to the main strut such that the first end can move around the perimeter, for example the outer circumference, of the main strut. Thus, the first end of the sidestay may be connected to move between a first angular position and a second angular position around the perimeter of the main strut. Providing a sidestay having an end with the freedom to move in such a manner about the longitudinal axis of the strut may effectively isolate the sidestay from torque loads experienced by the landing gear. Thus providing a sidestay having freedom to rotate about the longitudinal axis of the main strut may force torque loads to be transferred directly into the fuselage via the inboard links, rather than into the wing via the sidestay.

The landing gear may comprise a collar mounted on the main strut for movement relative to the main strut. The first end of the sidestay may be connected to the main strut via the collar. The collar may be mounted for movement along the longitudinal axis of the main strut. The collar may be configured to slide along the main strut. The collar may be mounted for rotation about the longitudinal axis of the main strut. The collar may be configured to slide about the main strut. The collar may be mounted for both translational (along the length and/or longitudinal axis) and rotational (about the length and/or longitudinal axis) movement relative to the main strut. The collar may comprise a radially extending lug. The first end of the sidestay may be pivotally attached to the collar, for example to the radially extending lug.

The landing gear may be configured such that lateral loads experienced by the landing gear are transferred to the aircraft via the sidestay, the inboard stay assembly and the link assembly.

The inboard stay assembly may extend between the main strut and the fuselage to provide a landing gear load path between those two elements when the landing gear is deployed. The inboard stay assembly may be configured to provide a landing gear load path between the main strut and the fuselage. The inboard stay assembly may be configured to cause landing gear loads to be transferred from the main strut to the fuselage via the inboard stay assembly without first passing via the wing. The first end of the inboard stay assembly may be connected to the strut (directly or indirectly) such that the first end of the stay assembly is located adjacent to the strut. The second end of the inboard stay assembly may be connected to the wing (directly or indirectly) such that the second end of the stay assembly is located adjacent to the wing.

The sidestay may extend between the main strut and the wing to provide a landing gear load path between those two elements when the landing gear is deployed. The sidestay may be configured to provide a landing gear load path between the main strut and the wing. The sidestay may be configured to cause landing gear loads to be transferred from the main strut to the wing via the sidestay without first passing via the fuselage. The first end of the sidestay may be connected to the strut (directly or indirectly) such that the first end of the sidestay is located adjacent to the strut. The second end of the sidestay may be connected to the wing (directly or indirectly) such that the second end of the sidestay is located adjacent to the wing.

The link assembly may extend between the main strut and an attachment point located on the aircraft. The link assembly may be configured to provide a landing gear load path between the main strut and the attachment point. The link assembly may be configured to cause landing gear loads to be transferred from the main strut to the aircraft at the attachment point. In the case that the attachment point is located on the wing, the link assembly may cause landing gear loads to be transferred from the main strut to the wing. In the case that the attachment point is located on a landing gear beam, the link assembly may cause landing gear loads to be transferred from the main strut to both the wing and the fuselage simultaneously. The first end of the link assembly may be connected to the strut (directly or indirectly) such that the first end of the link assembly is located adjacent to the strut. The second end of the link assembly may be connected to the aircraft (directly or indirectly) such that the second end of the link assembly is located adjacent to the wing, the fuselage and/or a landing gear beam.

The inboard stay assembly may comprise a pair of inboard stays, a first end of each inboard stay being attached to the main strut and a second end of each inboard stay being connected to the fuselage. A first end of each inboard stay may be attached to the main strut and a second end of each inboard stay may be connected to the fuselage such that landing gear loads can be transferred from the inboard stays into the fuselage. Thus, the inboard stay assembly load path may comprise two distinct load paths, one via each stay. The inboard stay assembly may comprise two physically distinct members. Each inboard stay may comprise a single member. Each of the pair of inboard stays may be configured to cause landing gear loads to be transferred via the stay into the fuselage. A landing gear connected via four points (2 inboard stays, link assembly, and a sidestay) in this manner may be statically indeterminate, allowing the load distribution via the landing gear to be adjusted by changing the properties of the landing gear and in particular the inboard stays, link assembly and sidestay. The first end of each inboard stay may be connected to the strut (directly or indirectly) such that the first end of the stay is located adjacent to the strut. The second end of each inboard stay may be connected to the fuselage (directly or indirectly) such that the second end of the stay is located adjacent to the fuselage.

A first one of the pair of inboard stays may be connected to the fuselage at a first attachment point. A second one of the pair of inboard stays may be connected to the fuselage at a second attachment point. The sidestay may be connected to the wing at a third attachment point. The link assembly may be connected to the aircraft at a fourth attachment point. The fourth attachment point may be located in between the first and/or second attachment points and the third attachment. The fourth attachment point may be located outboard of the first and/or second attachment points and inboard of the third attachment point. The fourth attachment point may be located outboard of the lateral position of the main strut when the landing gear is extended (e.g. when the main strut is substantially vertical). The fourth attachment point may be located on the wing such that at least a portion of the loads transferred via the link assembly are reacted at the wing. The fourth attachment point and/or an additional attachment point may be located on a landing gear beam such that at least a portion of the loads transferred via the link assembly are reacted at the wing and the fuselage simultaneously.

The link assembly may be attached to the main strut in the region of the upper (i.e. proximal) end of the strut. Each inboard stay may be attached to the main strut in the region of the upper (i.e. proximal) end of the strut. The link assembly and the inboard stays may be connected to the main strut at the same locations.

The inboard stays may be arranged such that in use, when the landing gear experiences a drag load a first one of the pair of inboard stays is in tension and the other of the pair of inboard stays is in compression. The pair of inboard stays may be connected to the main strut and fuselage such that they are symmetrical with one another about an axis substantially parallel to the lateral axis of the aircraft. The longitudinal distance (i.e. the distance in a direction substantially parallel to the longitudinal axis of the aircraft) between the second ends of the pair of inboard struts may be greater than the longitudinal distance between the first ends of the inboard struts. The longitudinal distance between the inboard stays may increase with distance from the main strut. The second attachment point may be spaced apart from the first attachment point along the longitudinal axis of the aircraft. The second attachment point may be located aft of the first attachment point. The first attachment point may be located forward of the main strut when the landing gear is extended. The second attachment point may be located aft of the main strut when the landing gear is extended.

Each of the pair of inboard stays may be attached to opposite sides of the main strut. For example, one of the inboard stays may be connected to the aft side of the main strut and the other of the inboard stays may be connected to the front side of the main strut. A first one of the pair of inboard stays may be attached to the main strut at a location on the circumference on the strut that is spaced apart by approximately 180 degrees to the circumferential location of the other strut. A first one of the pair of inboard struts may be attached to the main strut, for example to the aft of the strut, and extend away from the strut inboard and towards the aft of the aircraft. A second one of the pair of inboard struts may be attached to the main strut, for example to the front of the strut, and extend away from the strut inboard and towards the front of the aircraft.

The wing may comprise a spar. The spar may be the rear spar of the wing box. The spar may be the rear spar of the wing. The landing gear may be connected to the aircraft such that the main strut is located aft of the spar, for example the rear spar. Locating the main strut aft of the rear spar may facilitate the retraction of the landing gear into the wing.

The second end of the sidestay may be connected to the wing via an attachment point (e.g. the third attachment point) located on the spar. Thus, landing gear loads may be transferred from the sidestay to the wing via the spar. Attaching the sidestay to the aircraft at a point located on the a spar allows loads from the landing gear to be transferred into the wing at the strongest point of the structure thereby reducing and/or eliminating the need for additional reinforcement. In the case that the main strut is located aft of the spar, the outboard sidestay will extend away from the main strut in an outward, upwards and forward direction. The landing gear may be arranged such that in use, drag loads and lateral loads can be transferred via the outboard sidestay. The sidestay may comprise a single member extending between a first end which is connected to the main strut and a second end which is connected to the wing.

The wing may comprise a top cover. The second end of the link assembly may be connected to the top cover such that, in use when the landing gear is extended, landing gear loads can be transferred from the link assembly to the aircraft via the top cover. Thus, the fourth attachment point may be located on the underside of the top cover. Providing a landing gear which transmits at least a portion of the landing gear loads to the top cover may reduce the load concentration in other wing structures, for example the spar of the wing, thereby reducing and/or eliminating the need for reinforcement. The link assembly may be connected to the underside of the top cover using a spherical bearing.

In the case that the link assembly connects to the top cover a plurality of strengthening rods may extend across the underside of the top cover to an adjacent spar, for example the rear spar, such that landing gear loads can be transferred from the top cover to the spar.

The aircraft may comprise a landing gear beam. The landing gear beam may be connected at a first end to the fuselage. The landing gear beam may be connected at a second end to the wing. The landing gear beam may extend between the fuselage and the wing aft of the landing gear. The link assembly may be connected to the landing gear beam such that, in use, when the landing gear is extended, loads can be transferred from the link assembly to the wing and the fuselage via the landing gear beam. The landing gear beam may extend between the wing and the fuselage to provide a landing gear load path to each of those two elements when the landing gear is deployed. The link assembly may be connected to the landing gear beam to cause landing gear loads to be transferred to the wing and the fuselage via the landing gear beam. The first end of the landing gear beam may be connected to the fuselage (directly or indirectly) such that the first end of the beam is located adjacent to the fuselage. The second end of the landing gear beam may be connected to the wing (directly or indirectly) such that the second end of the beam is located adjacent to the wing.

The aircraft may comprise a trunnion extending between an attachment point (for example the fourth attachment point) located on the wing (for example on a spar) and an attachment point located on the landing gear beam. The link assembly may be connected to the trunnion such that landing gear loads can be transferred from the link assembly to the attachment points located on the wing and the landing gear beam. Mounting the landing gear using a landing gear beam may help to reduce the impact of any wing movement on the landing gear.

The aircraft may comprise a second landing gear beam. The second landing gear beam may be connected at a first end to the fuselage and at a second end to the wing. The second landing gear beam may extend between the fuselage and the wing forward of the landing gear. Thus, the second landing gear beam may extend between the spar and the landing gear. The aircraft may comprise a trunnion extending between an attachment point located on the first landing gear beam and an attachment point located on the second landing gear beam. The link assembly may be connected to the first and second landing gear beams, for example to the trunnion, such that landing gear loads can be transferred from the link assembly to the attachment points on the two landing gear beams. Mounting the landing gear using two landing gear beams may help to further reduce the impact of any wing movement on the landing gear.

The landing gear may be configured such that the length of the link assembly can vary during extension and/or retraction of the landing gear. The landing gear may be configured such that the proximal end of the main strut can move vertically relative to the wing as the length of the link assembly varies. The link assembly may be configured to fold while the landing gear is being retracted. Thus, the link assembly may be a foldable link. The link assembly may comprise at least one foldable stay. A foldable stay may comprise two arms pivotally connected such that the angle between the two arms can vary. A first arm may be connected at one end to the main strut and at the other end to the second arm. The second arm may be pivotally connected at one end to the first arm and at the other end to the aircraft. The link assembly may comprise a pair of foldable stays. When the landing gear is in the extended position, the link assembly may be in a straight configuration. In the straight configuration, the angle between the two arms of each foldable stay may be approximately 180 degrees. When the landing gear is in the retracted position, the link assembly may be in a folded configuration. In the folded configuration, the angle between the two arms of each foldable stay may be between less than 20 degrees, for example less than 10 degrees. In the folded configuration the second end of the link assembly may be located adjacent to the first end of the link assembly.

The landing gear may be configured such that the length of the inboard stay assembly, for example each inboard stay, remains constant during extension and/or retraction of the landing gear. The landing gear may be configured such that the inboard stay assembly, for example each inboard stay, can rotate about its second end during extension and/or retraction of the landing gear. The landing gear may be configured such that the proximal end of the main strut can move in a spanwise direction relative to the wing as the inboard stay assembly, for example each inboard stay, rotates.

The wing may be a composite wing. Thus, at least a portion of the wing may be constructed using composite materials. The spar may be a composite spar. The top cover may be a composite panel. Composite materials may include metal or polymer composites, for example metal matrix composites, hybrid composites or fibre-reinforce polymers such as Carbon Fibre Reinforced Polymer (CFRP).

The main strut may comprise an upper end and a lower end. The lower end of the strut may be configured for connection to one or more wheels. The lower end of the strut may be configured for connection to a bogie comprising one or more wheels. The main strut may be an oleo strut. The oleo strut may comprise a cylinder and a piston located for movement relative to the cylinder. In the case that the first end of the sidestay is connected for movement relative to the main strut, it will be appreciated that the first end of the sidestay may be connected for movement relative to the cylinder and/or the piston.

The aircraft may be a commercial aircraft, for example a commercial passenger aircraft, for example a single aisle or twin aisle aircraft. The aircraft may be suitable for carrying more than 50 passengers, for example more than 100 passengers.

According to a second aspect of the invention there is provided a method of retracting a landing gear connected to an aircraft having a fuselage and a wing. The landing gear may comprise one or more of; a main strut; an inboard stay assembly, a first end of the inboard stay assembly being attached to the main strut and a second end the inboard stay assembly being connected to the fuselage; a sidestay, a first end of the sidestay being connected to the main strut and a second end of the sidestay being connected to the wing; and a link assembly, a first end of the link assembly being attached to the main strut and a second end of the link assembly being connected to the aircraft. The method may comprise retracting the landing gear from an extended position to a retracted position by rotating the main strut about an axis of rotation extending substantially parallel to the longitudinal axis of the aircraft. Thus, the landing gear may retract sideways. Retracting the landing gear sideways may facilitate the accommodation of the multipoint gear within the envelope of the aircraft, by allowing a portion of the landing gear to be accommodated within the fuselage as well as the wing when the gear is retracted.

The step of retracting the landing gear may comprise two simultaneous movements of the main strut; a rotation and a translation. This two part movement may facilitate compact storage of the retracted landing gear. The rotation may comprise rotating the main strut about a centre of rotation. The translation may comprise displacing the centre of rotation while the main strut rotates (e.g. as the landing gear retracts).

As the landing gear retracts, the centre of rotation may move upwards towards the wing. As the landing gear retracts, the centre of rotation may move outboard. As the landing gear retracts the main strut may translate vertically towards the wing and laterally in an outboard direction (and in the opposite direction when the landing gear extends). Thus, the landing gear may be configured such that the centre of rotation of the main strut is displaced outward (i.e. further outboard) as the landing gear retracts. The landing gear may be configured such that the centre of rotation of the main strut is displaced upward (i.e. toward the wing) as the landing gear retracts.

The locus of the centre of rotation during retraction and/or extension of the landing gear may be determined by the movement of the link assembly and the inboard stay assembly, for example the pair of inboard stays. The centre of rotation may have a fixed location with respect to the main strut while moving relative to the rest of the aircraft. The centre of rotation may be located on the main strut at the point at which the inboard stay assembly and/or the link assembly are connected to the main strut. The inboard stay assembly and the link assembly may be attached to the main strut at substantially the same position along the length of the strut. The inboard stay assembly and/or the link assembly may be attached to the main strut at a region adjacent to the proximal (i.e. closest to the wing when the gear is extended) end of the main strut. The centre of rotation of the main strut may be located in the region of the proximal end of the main strut. Thus, the proximal end of the main strut may be displaced outward (i.e. further outboard) as the main strut rotates between the extended and retracted position. The proximal end of the main strut may be displaced upward (i.e. toward the wing) as the main strut rotates.

The proximal end of the main strut may follow a first locus during retraction, moving in an arc outboard and upwards. The proximal end of the main strut may follow the first locus in the opposite direction during extension. The distal end of the main strut may follow a second locus during retraction, moving in an arc inboard and upwards. The distal end of the main strut may follow the second locus in the opposite direction during extension.

The length of the link assembly may vary as the landing gear moves between the extended and retracted positions. The length of the link assembly may reduce as the landing gear retracts such that the centre of rotation of the main strut moves upwards. For example, the link assembly, for example each foldable stay, may fold as the gear is being retracted. Conversely, the length of the link assembly may increase as the landing gear extends, such that the centre of rotation of the main strut moves downwards. The method may comprise reducing the length of the link assembly by allowing the link assembly to fold. In the extended position the link assembly may be straight. In the retracted position the link assembly may be folded.

The length of the inboard stay assembly, for example the pair of inboard stays, may remain constant while the landing gear retracts and/or extends. The inboard stay assembly may rotate as the gear is being retracted such that the centre of rotation of the main strut moves outwards (i.e. further outboard). The inboard stay assembly may rotate about its point(s) of attachment to the aircraft. For example each inboard sidestay may pivot about an axis substantially parallel to the longitudinal axis of the aircraft at their second end. It may be that the inboard stay assembly rotates while the length of the link assembly varies and that this combination of movement determines the locus of the centre of rotation of the main strut.

When the landing gear is in the extended position the longitudinal axis of the main strut may be substantially perpendicular to the wing. When the landing gear is in the retracted position the longitudinal axis of the main strut may be substantially parallel to the wing. It may be that in the retracted position the landing gear is located within the envelope of the wing and/or fuselage of the aircraft.

It may be that the first end of the sidestay moves along a portion of the length of the main strut as the landing gear retracts and/or extends. It may be that the first end of the sidestay moves around a portion of the perimeter of the main strut as the main strut rotates. Thus, as the landing gear retracts the first end of the sidestay may rotate about the longitudinal axis of the main strut towards the front side of the main strut. As the landing gear retracts the first end of the sidestay may move from the outboard side of the main strut to the front of the main strut (and vice versa as the landing gear extends). In the case that the main strut is located aft of a spar, the first end of the sidestay may move around the longitudinal axis of the main strut such that in the retracted position a portion of the sidestay is located between the spar and the main strut. Storing the sidestay between the main strut and the spar may reduce the amount of space occupied by the landing gear when the landing gear is in the retracted position.

It may be that when the landing gear is extended, the sidestay extends outward (i.e. in an outboard direction) away from the main stay such that no portion of the sidestay is located within a notional regional extending parallel to the longitudinal axis of the aircraft between the front of the main strut and the rear of the spar. As the first end of the sidestay rotates around the longitudinal axis of the strut a portion of the sidestay, for example the region adjacent the first end of the sidestay, may move into said notional region. Thus, in the retracted position, a portion of the sidestay may lie within the notional region.

The landing gear may be configured such that the first end of the sidestay moves between the side of the main strut and the front of the main strut as the landing gear extends and retracts. When the landing gear is in the extended position, the first end of the sidestay may be located at a position on the side, for example the outboard side of the main strut. When the landing gear is in the retracted position, the first end of the sidestay may be located at a position to on the front of the main strut.

According to further aspects of the invention there is provided a landing gear configured for use as the landing gear of any other aspect, an aircraft including a landing gear suitable for using in the method of any other aspect and/or a method of retracting and/or extending a landing gear of any other aspect.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 5(a) shows a schematic view of a portion of the landing gear of the first embodiment in the extended position;

FIG. 5(b) shows a schematic view of a portion of the landing gear of the first embodiment in the intermediate position;

FIG. 5(c) shows a schematic view of a portion of the landing gear of the first embodiment in the retracted position;

DETAILED DESCRIPTION

Figure 1:
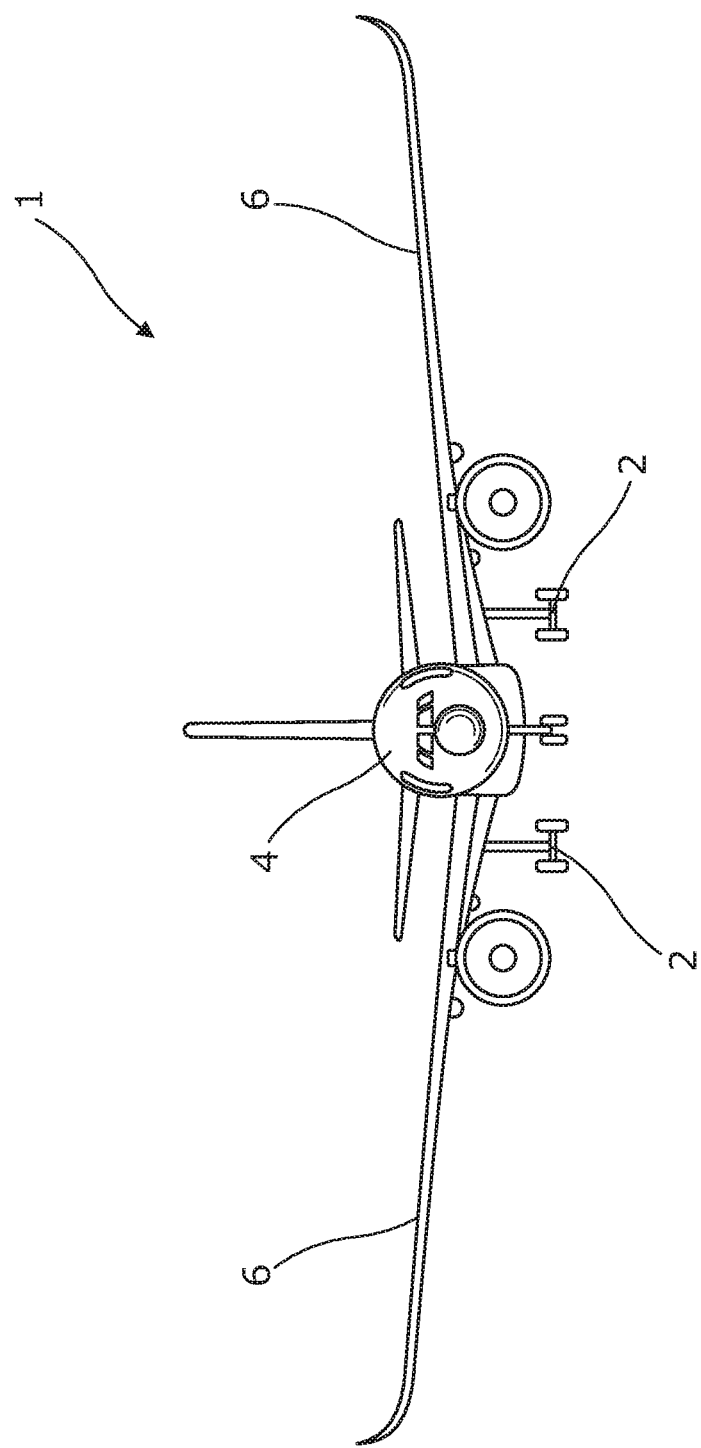
FIG. 1 shows a front view of an aircraft including a landing gear according to a first example embodiment of the invention.

FIG. 1 shows an aircraft 1 including a main landing gear 2 in accordance with a first embodiment of the invention. The aircraft comprises a conventional fuselage 4 and wings 6 attached to the fuselage 4.

Figure 2:
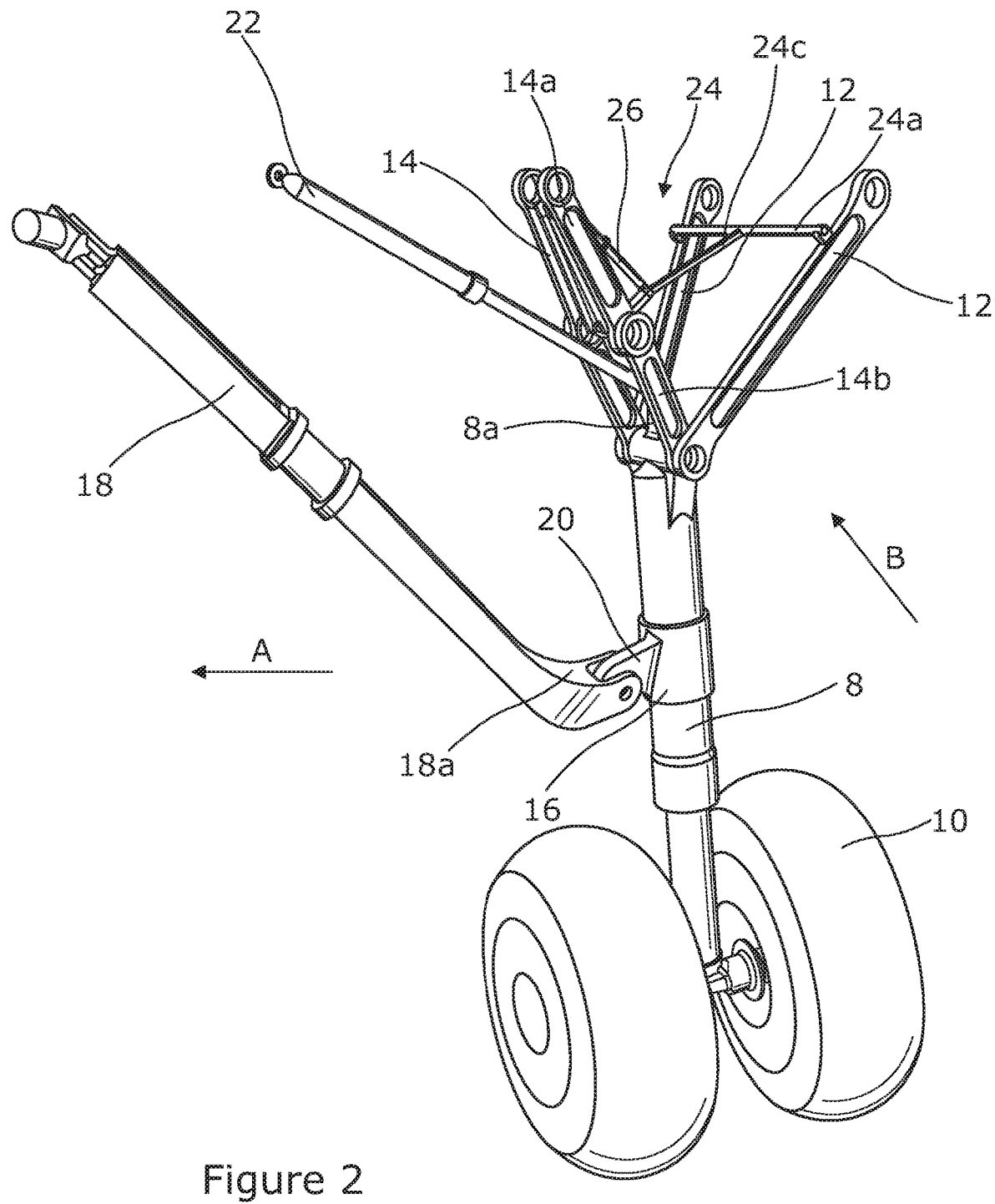
FIG. 2 shows a perspective view of a landing gear according to the first example embodiment.

FIG. 2 shows a close up view of the landing gear 2 of the first embodiment. The gear comprises a main strut 8, connected at the lower end to a pair of wheels 10 in the conventional manner. At the upper end, the main strut 8 is pivotally connected to a pair of inboard links 12. Each of the inboard links 12 comprises a single member extending between a first end pivotally attached to the top of the main strut 8 and a second end which is connected to the aircraft fuselage 4 (not shown in FIG. 2). A pair of foldable stays 14 are pivotally connected at the lower end to the upper end of the main strut 8, in the same location as the inboard links 12. Each foldable stay 14 comprises an upper arm 14a and a lower arm 14b. Each upper arm 14a is pivotally attached at one end to the lower arm 14b. Each lower arm 14b is pivotally attached to the upper arm 14a at one end, and to the top of the main strut 8 at the other end. A cylindrical collar 16 is mounted on the main strut 8. A sidestay 18 is pivotally connected at a first end to radially extending lug 20 on the cylindrical collar 16. The sidestay 18 has a curved portion 18a in the region of the first end so that the sidestay 18 extends away from the main strut 16 in an upwards, outboard and forward direction. A main actuator 22 is connected to a lug 8a located at the top of the main strut 8. A locking assembly 24 includes a first locking member 24a extending horizontally between the two inboard links 12, a second locking member 24b (not visible in FIG. 2) extending horizontally between the two foldable stays 14 and a hinged locking link 24c extending in the spanwise direction between the first and second locking members 24a, 24b. The hinged locking link 24c includes two members pivotally connected to each other. A lock actuator 26 is connected to the locking link 24c.

Figure 3:
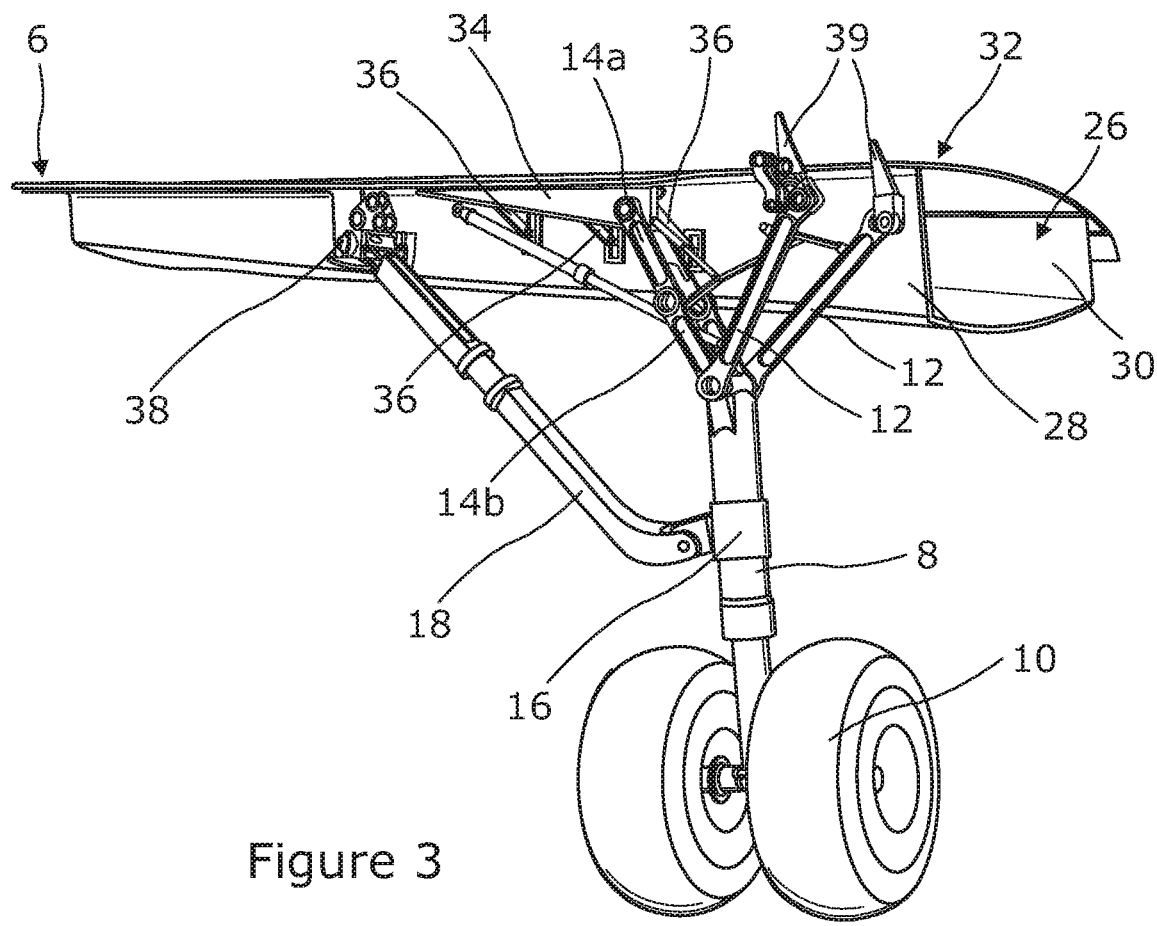
FIG. 3 shows a perspective view of a portion of a wing and a landing gear according to the first example embodiment when the landing gear is in the extended position.

FIG. 3 shows the landing gear of FIG. 2 attached to a portion of the wing 6 when the landing gear 2 is in the extended position. The wing 6 comprises a wing box 26 having a rear spar 28 and a front spar 30, and a top cover 32 extending between and beyond the spars 28, 30 in the chordwise direction to form the upper surface of the wing 6. In the extended position of FIG. 3 the main strut 8 is vertical and located to the aft of the rear spar 28. A mounting bracket 34 is connected to the underside of the top cover 32 aft of the rear spar 28. A number of reinforcing rods 36 extend along the underside of the top cover 32 between the mounting bracket 34 and the rear spar 28. The upper ends of the folding stays 14, that is the upper end of upper arm 14b, are connected to the mounting bracket 34 using a spherical bearing (not shown in FIG. 3). The second end of each inboard stay 12 is connected to a point on the aircraft fuselage 4 (not shown in FIG. 2) aft of the wing 6 via a conventional drop link. The sidestay 18 extends away from the main strut 16 in an upwards, outboard and forward direction and is pivotally connected at its upper end to a mounting bracket 38 located on the rear spar 28.

Figure 4:
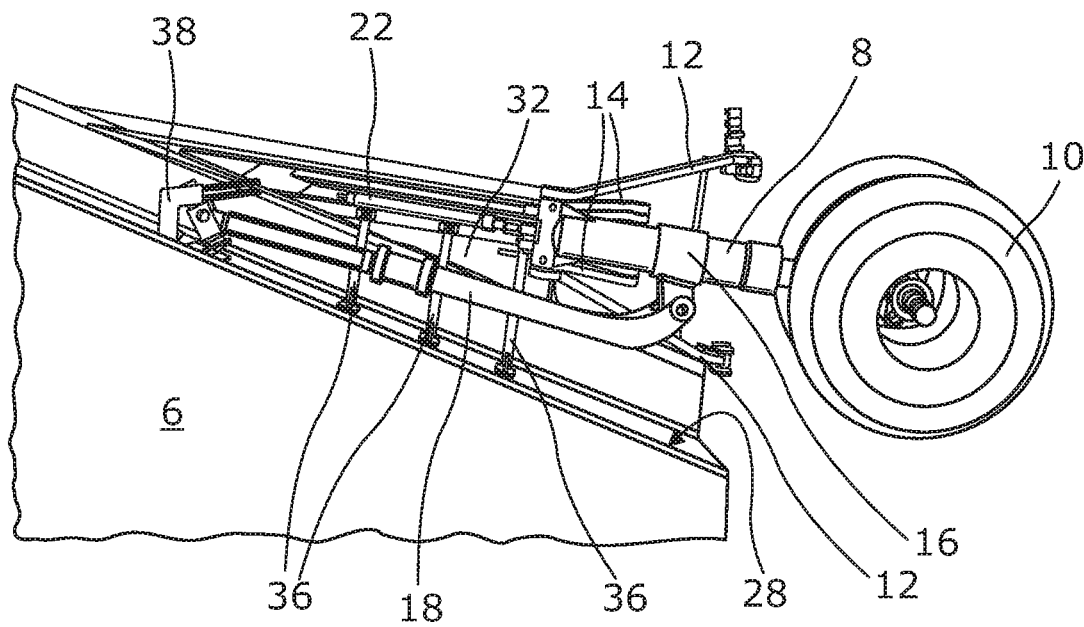
FIG. 4 shows a perspective view of a portion of a wing and a landing gear according to the first example embodiment when the landing gear is in the retracted position.

FIG. 4 shows a plan view of the landing gear of FIGS. 2 and 3 when the landing gear 2 is in the retracted position. In the retracted position of FIG. 4 the main strut 8 is horizontal and located aft of the rear spar 28. The collar 16 has rotated around the main strut 8 such that the first end of the sidestay 18 lies on the front side of the strut 8. The sidestay 18 is substantially horizontal and extends between the collar 16 and the bracket 38 on the rear spar 28 and lies between the main strut 8 and the rear spar 28. The foldable stays 14 have folded up and the distal ends of the inboard stays 12 have rotated outboard.

In use, when the landing gear is deployed the main strut 8 is locked in the down position by the main actuator 22. The lock actuator 26 holds hinged locking link 24c in a straight configuration thereby preventing the foldable stays 14 from folding (i.e. holding the foldable stays 14 in the straight configuration) and fixing the angle between the foldable stays 14 and the inboard stays 12 so that the later are locked in place. Vertical loads experienced by the landing gear 2 are transferred to the wing 6 via the folding stays 14 and to the aircraft fuselage via inboard links 12. The sidestay 18 is effectively isolated from vertical loads experienced by the landing gear strut 2 by virtue of the collar 16 which can slide relative to the longitudinal axis of the strut 8. Drag loads experienced by the landing gear are transferred into the fuselage via the inboard links 12 and into the rear spar 28 of the wing 6 via the sidestay 18. The spherical bearing which connects each foldable stay 14 to the mounting bracket 34 permits rotation of the foldable stays 14 about an axis substantially parallel to the lateral axis of the aircraft such that substantially no drag loads are transferred from the landing gear 2 to the aircraft 1 via the foldable stays 14. Lateral loads experienced by the landing gear 2 can be transferred into the wing via the sidestay 18, foldable stays 14 and inboard links 12. Accordingly, in landing gear in accordance with the present embodiment the majority of the landing gear loads, and in particular the drag loads, may be reacted either via the sidestay 18 which is attached to a wing spar 28 or via the inboard links 6 which are connected to the fuselage thereby reducing the amount of off-axis load transferred to the wing 6, as less load is transferred via the foldable stays 14. Additionally, the connection of the sidestay 18 to the spar 28 may reduce the need for additional reinforcement in comparison with prior art designs as the spar 28 is already sized to withstand significant loads.

In use, the landing gear is moved between an extended position (as shown in FIG. 3) and a retracted position (as shown in FIG. 4) in which the landing gear is contained within the envelope of the wing 6 and fuselage by rotating around an axis lying substantially parallel to the longitudinal axis of the aircraft (i.e. the gear is retracted sideways). When the gear 2 is to be retracted the main actuator 22 pulls on the lug 8a at the top of the main strut 8 and the locking actuator 26 is released. As the main actuator 22 pulls on the lug 8a the main strut rotates 8 about the point at which the foldable stays 14 and inboard stays 12 connect to the strut 8. With the locking actuator 26 released the locking link 24c can fold, which in turn allows the foldable stays 14 to fold and the inboard stays 12 to rotate about the point at which they attach to the aircraft. As the strut 8 moves towards the retracted position, the collar 16 slides along and rotates about the longitudinal axis of the main strut 8, and the lug 20 moves from the outboard side of the strut towards the front of the strut taking the first end of the sidestay 18 with it and thereby causing a portion of the sidestay 18 to move into the region between the main strut 8 and rear spar 28. Thus, landing gear in accordance with the present embodiment may take up less space when retracted because the sidestay is stored in between the main strut and the spar.

FIG. 5 shows a schematic view of a portion of the landing gear 2 in accordance with the first embodiment at various stages of the retraction process. Each inboard stay 12 is pivotally connected to the strut 8 at a point on the longitudinal axis of the strut 8 which is labelled P in FIG. 5. The other end of each inboard stay 12 is connected to the fuselage at a point labelled A2 in FIG. 5. Each folding stay 14 is pivotally connected at one end to the strut 8 at point P, and at the other end to the aircraft at a point labelled A1 in FIG. 5. A dashed line labelled C in FIG. 5 denotes the arc followed by the distal end of each inboard stay 12 as the stay pivots about point A2.

In FIG. 5(a) the landing gear is extended, the strut 8 is vertical, the foldable stays 14 are straight and point P, to which the foldable stays 14 and inboard stays 12 are connected is located towards the lower end of the arc C. In FIG. 5(b) the landing gear is in an intermediate position, each inboard stay 12 has pivoted about point A2, the point P has moved outboard and upwards along the arc C, the foldable stay 14 is partially folded as the strut 8 is rotated inboard about point P. In FIG. 5(c) the landing gear is in the retracted position; the inboard stays 12 have pivoted further about point A2, the point P has moved further outboard and upwards along the arc C, the foldable stay 14 is folded and the main strut 8 has rotated further inboard and is horizontal. Thus, in landing gear in accordance with the present embodiment the retraction of the landing gear comprises both a rotation and a translation; the main strut is rotated from the vertical to the horizontal while the point P, about which the strut rotates, moves upwards and outboard. This translation of the main strut facilitates storage of the landing gear within the aircraft envelope by moving the proximal end of the main strut further outboard on the wing.

Figure 6:
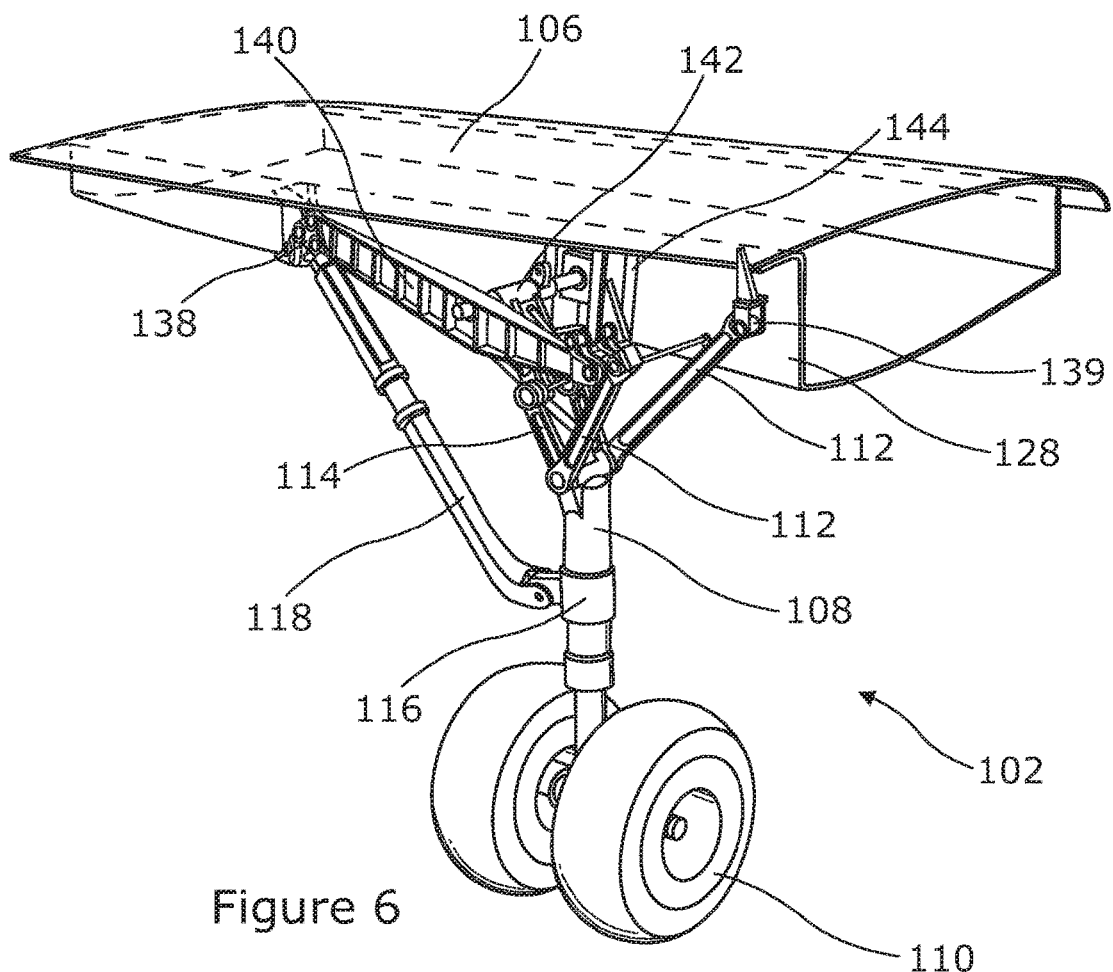
FIG. 6 shows a perspective view of a portion of a wing and a landing gear according to a second example embodiment of the invention, when the landing gear is in the extended position.

FIG. 6 shows a landing gear 102 in accordance with a second example embodiment of the invention. Only those aspects of the second embodiment which differ with respect to the first embodiment will be discussed here. Like reference numerals denote like elements and in this embodiment, for example, 106 denotes wings, 108 denotes strut, 116 denotes a cylindrical collar, 139 denotes a bracket, 110 denotes wheels, and 114 denotes foldable stays. In the second embodiment the bracket 34 that connects folding stays 14 to top cover 32 has been replaced by a landing gear beam 140, a trunnion 142 and central bracket 144. The landing gear beam 140 is attached at one end to the bracket 138 via which the sidestay 118 connects to the rear spar 128. The other end of the beam 140 is attached to the aircraft (not shown in FIG. 6) at the same location as the rearmost inboard stay 112. The central bracket 144 is located on the rear spar 128, inboard of the bracket 138 to which the sidestay 118 connects. The trunnion 142 extends between the landing gear beam 140 and the central bracket 144. In use, loads transmitted to the aircraft via the foldable stays 14 will be transmitted to the rear spar 128 via brackets 138 and 144 and to the fuselage at the same location as the rearmost inboard stay 112. Embodiments in which the landing gear is connected to the aircraft via a landing gear beam may facilitate the inclusion of the landing gear in existing aircraft designs and/or help to isolate the landing gear from wing movement.

Figure 7:
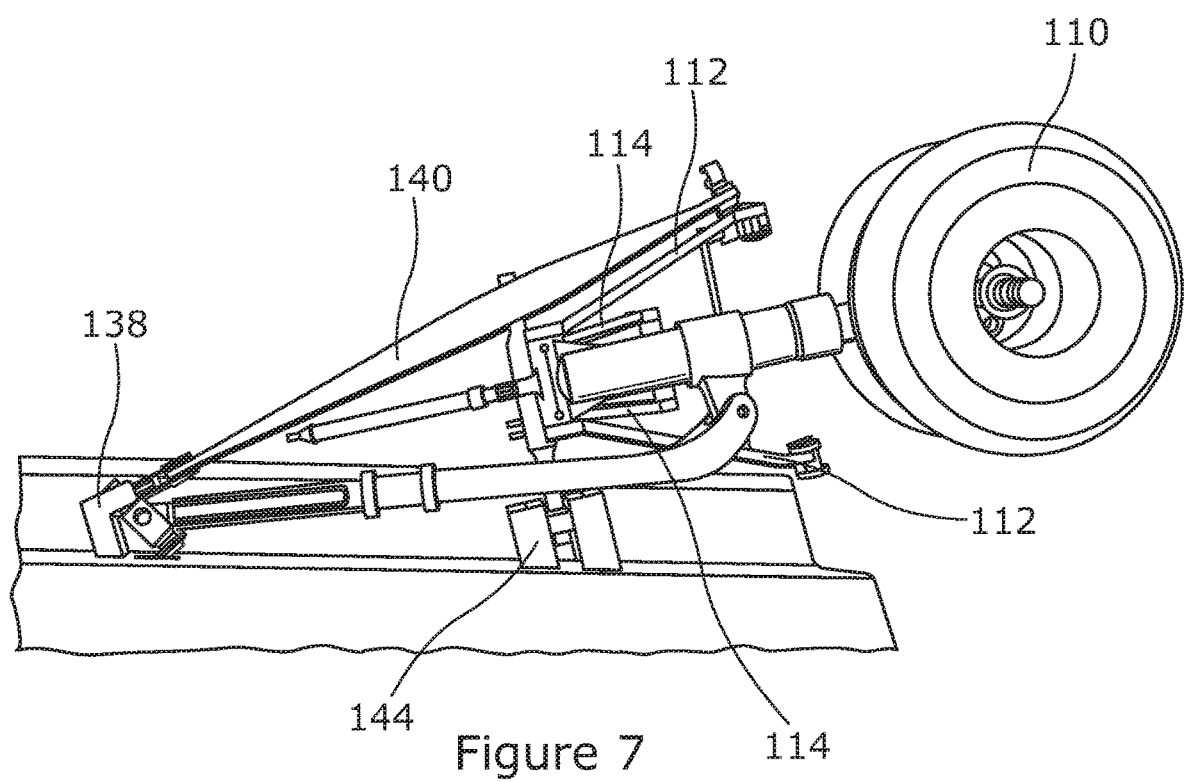
FIG. 7 shows a perspective view of a portion of a wing and a landing gear in accordance with the second example embodiment, when the landing gear is in the retracted position.
Figure 8:
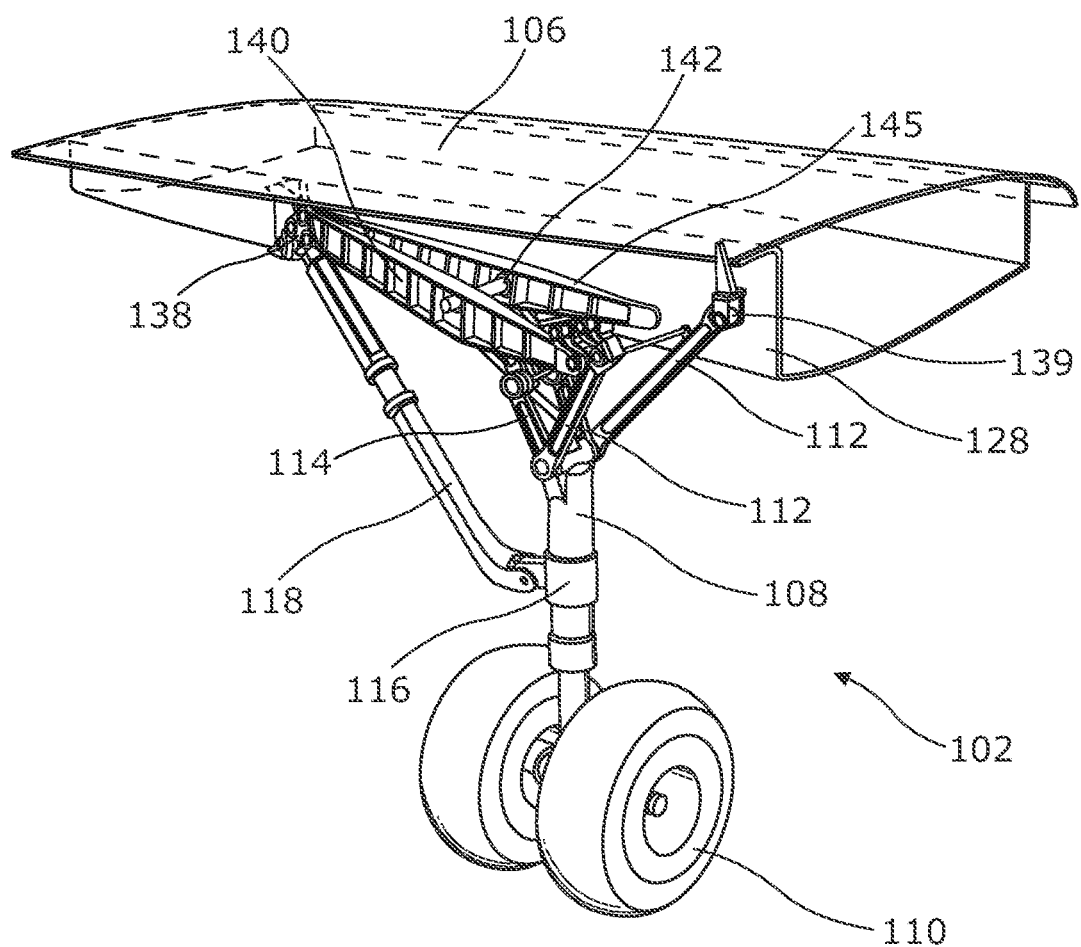
FIG. 8 show a perspective view of a portion of a wing and a landing gear.

FIG. 7 shows the landing gear of the second embodiment in the retracted position, the main strut 102 lies between the landing gear beam 140 and the rear spar 138.

In a third embodiment, not shown, the central bracket 144 may be replaced by a second landing gear beam 145 extending alongside the first landing gear beam, on the front side of the main strut 8. In this embodiment the trunnion (with the foldable stays connected thereto) will extend between the two landing gear beams. Thus, landing gear in accordance with the third embodiment may further isolate the foldable stays from any wing movement experienced during flight.

Whilst the present invention has been described and illustrated with reference to particular embodiments, it will be appreciated by those of ordinary skill in the art that the invention lends itself to many different variations not specifically illustrated herein. By way of example only, certain possible variations will now be described. For example, it will be appreciated that while the embodiments described above include an inboard stay assembly in the form of a pair of distinct stays, it will be appreciated that the inboard stay assembly may be a single component that attaches to the aircraft and/or the strut at two points. Similarly, while the embodiments described above include a link assembly in the form of two folding stays, it will be appreciated that a single component may fulfil the role of the two stays. While the embodiments described above each comprise an inboard stay assembly (in the form of a pair of inboard stays), a link assembly (the folding stays) and a sidestay, it will be appreciated that certain advantages of the invention can be achieved without all three of these elements. For example, the movement of the centre of rotation during retraction may be achieved in a landing gear having an inboard stay assembly and a link assembly, but no sidestay. Similarly, the compact storage configuration achieved by the sidestay in the above embodiments may be useful in landing gear that do not include an inboard stay assembly and/or a link assembly. Finally, while the embodiments described above include two landing gear wheels, it will be appreciated that the landing gear may comprise more than two wheels, for example four, six, eight or more wheels, or a single wheel. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a fuselage, a wing connected to the fuselage and a landing gear, the landing gear comprising
   a main strut,
   an inboard stay assembly, a first end of the inboard stay assembly being attached to the main strut and a second end of the inboard stay assembly being connected to the fuselage such that landing gear loads can be transferred from the inboard stay assembly into the fuselage;
   a sidestay, a first end of the sidestay being connected to the main strut and a second end of the sidestay being connected to the wing such that landing gear loads can be transferred from the sidestay into the wing; and
   a link assembly comprising an upper arm having a first end and a lower arm having a second end, wherein the first end is attached to the main strut and the second end is connected to the aircraft such that landing gear loads can be transferred via the link assembly into the aircraft,
   wherein the landing gear is arranged such that, in use, when the landing gear is extended, substantially all the landing gear loads are transferred from the landing gear to the aircraft via one or more of the inboard stay assembly, the sidestay and the link assembly, and
   wherein the link assembly is configured such that the relative movement between the upper arm and the lower arm varies the distance between the first end and the second end of the link assembly as the landing gear retracts.

2. The aircraft according to claim 1, wherein the inboard stay assembly comprises a pair of inboard stays, a first end of each inboard stay being attached to the main strut and a second end of each inboard stay being connected to the fuselage such that landing gear loads can be transferred from the inboard stay assembly into the fuselage.

3. The aircraft according to claim 1, wherein the connection between the second end of the link assembly and the aircraft allows for rotational freedom such that transmission of drag loads from the landing gear to the aircraft via the link assembly is prevented.

4. The aircraft according to claim 1, wherein the first end of the sidestay is connected to the main strut for movement along a portion of the length of the main strut.

5. The aircraft according to claim 1, wherein the wing comprises a spar and the second end of the sidestay is connected to the wing via an attachment point located on the spar.

6. The aircraft according to claim 5, wherein the landing gear is connected to the aircraft such that the main strut is located aft of the spar.

7. The aircraft according to claim 1, wherein the wing comprises a top cover and the link assembly is connected to an attachment point located on the top cover such that, in use when the landing gear is extended, landing gear loads are transferred from the link assembly to the aircraft via the top cover.

8. The aircraft according to claim 1, wherein the aircraft includes a first landing gear beam connected at a first end to the fuselage and at a second end to the wing, and wherein the link assembly is connected to an attachment point located on the first landing gear beam such that, in use, loads can be transferred from the link assembly to both the wing and the fuselage via the first landing gear beam.

9. The aircraft according to claim 8, wherein the aircraft includes a second landing gear beam connected at a first end to the fuselage and at a second end to the wing, and wherein the link assembly is also connected to an attachment point located on the second landing gear beam such that, in use, loads can be transferred from the link assembly to both the wing and the fuselage via the second landing gear beam and the first landing gear beam.

10. The aircraft according to claim 1, wherein the wing comprises a spar, and the link assembly is connected to an attachment point located on the spar such that, in use when the landing gear is extended, landing gear loads are transferred from the link assembly to the aircraft via the spar.

11. The aircraft according to claim 1, wherein the inboard stay assembly and the link assembly are pivotally attached to the main strut in the region of the proximal end of the strut.

12. The aircraft according to claim 1, wherein the wing is a composite wing.

13. An aircraft comprising a fuselage, a wing connected to the fuselage and a landing gear, the landing gear comprising
a main strut,
an inboard stay assembly, a first end of the inboard stay assembly being attached to the main strut and a second end of the inboard stay assembly being connected to the fuselage such that landing gear loads can be transferred from the inboard stay assembly into the fuselage,
a sidestay, a first end of the sidestay being connected to the main strut and a second end of the sidestay being connected to the wing such that landing gear loads can be transferred from the sidestay into the wing, and
a link assembly, a first end of the link assembly being attached to the main strut and a second end of the link assembly being connected to the aircraft such that landing gear loads can be transferred via the link assembly into the aircraft,
and wherein the landing gear is arranged such that, in use, when the landing gear is extended, substantially all the landing gear loads are transferred from the landing gear to the aircraft via one or more of the inboard stay assembly, the sidestay and the link assembly,
wherein the first end of the sidestay is connected to the main strut for rotation about the length of the main strut.

14. The aircraft according to claim 13, wherein the landing gear comprises a collar mounted on the main strut for movement along the length of the main strut and rotation about the length of the main strut, and wherein the first end of the sidestay is connected to the main strut via the collar.

15. A method of retracting a landing gear connected to an aircraft having a fuselage and a wing, the landing gear comprising
a main strut;
an inboard stay assembly, a first end of the inboard stay assembly being attached to the main strut and a second end of the inboard stay assembly being connected to the fuselage;
a sidestay, a first end of the sidestay being connected to the main strut and a second end of the sidestay being connected to the wing; and
a link assembly comprising an upper arm having a first end and a lower arm having a second end, wherein the first end is attached to the main strut and the second end is connected to the aircraft,
the method comprising retracting the landing gear from an extended position to a retracted position by rotating the main strut about an axis of rotation extending substantially parallel to the longitudinal axis of the aircraft,
wherein the link assembly is configured such that the relative movement between the upper arm and the lower arm varies the distance between the first end and the second end of the link assembly as the landing gear retracts.

16. The method according to claim 15, wherein the main strut rotates about a centre of rotation, and wherein the centre of rotation of the main strut is displaced upwards and outboard as the landing gear retracts.

17. The method according to claim 16, wherein the locus of the centre of rotation is determined by the movement of the link assembly and the inboard stay assembly as the landing gear retracts.

18. The method according to claim 17, wherein the length of the link assembly reduces as the main strut rotates such that the centre of rotation is displaced upwards as the landing gear retracts.

19. The method according to claim 18, wherein the inboard stay assembly comprises a pair of inboard stays and each inboard stay rotates about its second end such that the centre of rotation is displaced upwards and outwards as the landing gear retracts.

20. The method according to claim 15, wherein the first end of the sidestay moves around a portion of the perimeter of the main strut as the landing gear retracts.

21. The method according to claim 20, wherein the wing comprises a spar and the first end of the sidestay moves around the perimeter of the main strut until at least a portion of the sidestay is located in between the spar and the main strut.

22. A method of retracting a landing gear connected to an aircraft having a fuselage and a wing, the landing gear comprising a main strut, an inboard stay assembly, a first end of the inboard stay assembly being attached to the main strut and a second end of the inboard stay assembly being connected to the fuselage;

a sidestay, a first end of the sidestay being connected to the main strut and a second end of the sidestay being connected to the wing; and a link assembly, a first end of the link assembly being attached to the main strut and a second end of the link assembly being connected to the aircraft, the method comprising retracting the landing gear from an extended position to a retracted position by rotating the main strut about an axis of rotation extending substantially parallel to the longitudinal axis of the aircraft, wherein the first end of the sidestay moves along a portion of the length of the main strut as the landing gear retracts.

* * * * *